C. O. TORGERSON.
STAKE HOLDER.
APPLICATION FILED JULY 16, 1919.
1,342,654.
Patented June 8, 1920.
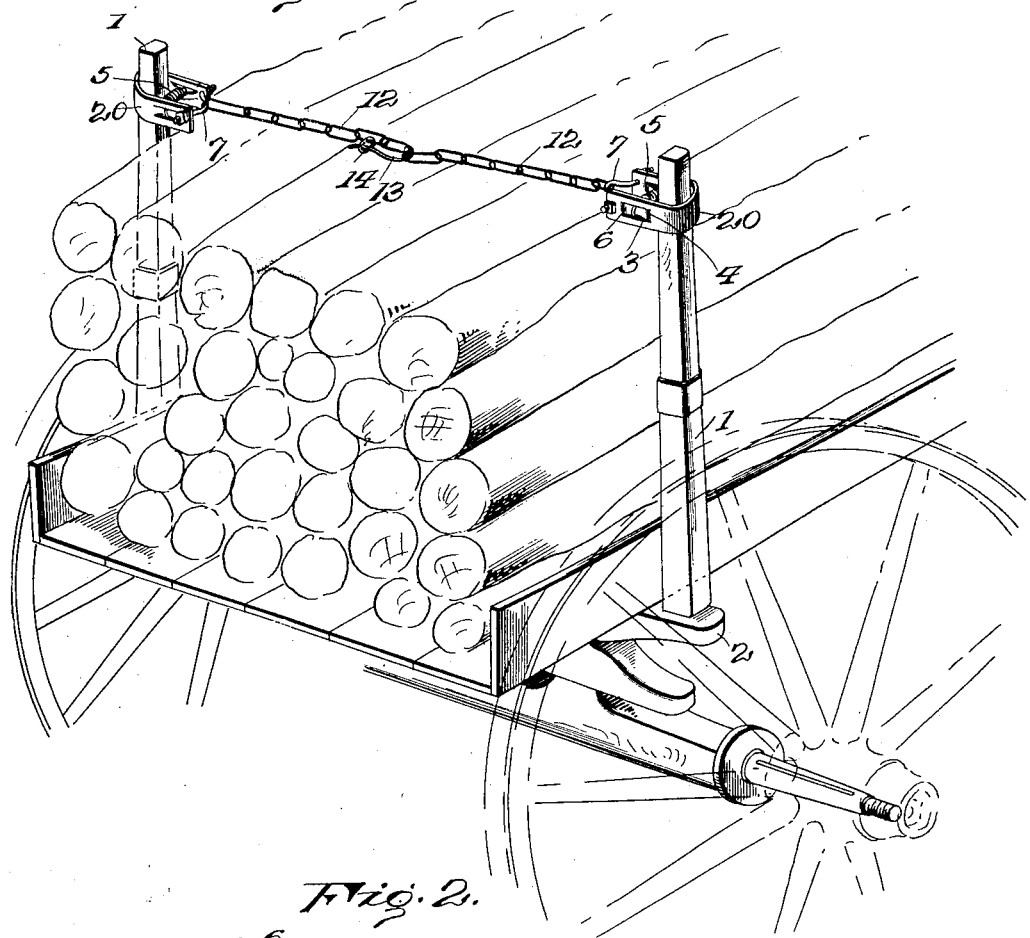
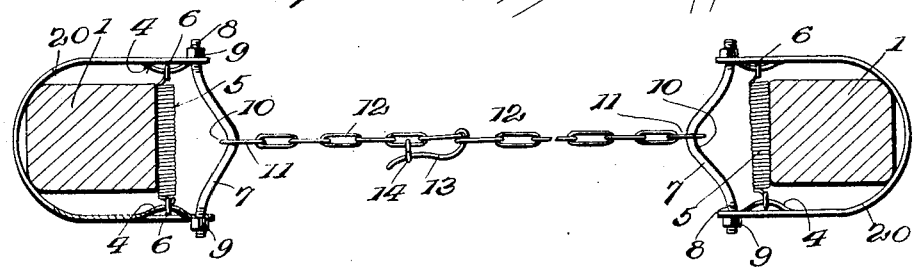
Inventor
Carl O. Torgerson
by Lacy & Lacy,
his Atty's.

UNITED STATES PATENT OFFICE.

CARL O. TORGERSON, OF HOUSTON, MINNESOTA.

STAKE-HOLDER.

1,342,654.　　　　Specification of Letters Patent.　　Patented June 8, 1920.

Application filed July 16, 1919. Serial No. 311,231.

*To all whom it may concern:*

Be it known that I, CARL O. TORGERSON, a citizen of the United States, residing at Houston, in the county of Houston and State of Minnesota, have invented certain new and useful Improvements in Stake-Holders, of which the following is a specification.

This invention has for its object the provision of an improved construction whereby the stakes of a vehicle which are employed to restrain the load against lateral movement will be effectually prevented from spreading under the load. Specifically, the object of the invention is to provide an improved device whereby a yieldable stake-engaging member of the general type disclosed in Letters Patent No. 1,170,366, granted to me February 1, 1916, will be more firmly held and the stake-engaging loop more effectually prevented from spreading and held to the stake.

The invention is illustrated in the accompanying drawings, in which—

Figure 1 is a perspective view of the improved stake holder in operative position;

Fig. 2 is a plan view of the same.

It is to be understood that the invention is applicable to stakes upon wagons, trucks, or sleds, but for convenience of illustration, I have shown the stakes 1 as rising from the bolster 2 of a wagon. In carrying out the invention, I employ a substantially U-shaped loop 20 of flat metal which is adapted to have its intermediate portion bear against the outer side of the stake and have its side portions extend parallel with the sides of the stake to a point beyond the inner face of the stake. In each side portion of each loop, I form parallel slits 3, the intermediate portions 4 being struck in so as to project beyond the inner face of the loop, as clearly shown in Fig. 2. A coiled spring 5 is disposed between the sides of the loop and this spring is provided at its ends with eyes or hooks 6 adapted to engage around the said struck-in portions 4, as clearly shown. In the extremities of the side members of each loop, I provide perforations through which are engaged the ends of a rod 7 which ends are threaded, as shown at 8, to receive nuts 9 which are turned home against the outer sides of the loops so as to firmly secure the same upon the rod. The intermediate portion of the rod 7 is substantially V-shape so as to provide a central seat 10 for the end link 11 of a flexible connecting member or chain 12. The chain 12 is duplicated of course, one chain being carried by each bar 7 and to the end of one chain I attach a draw hook or locking lever 13 which is adapted to be inserted through a link of the meeting chain and have its end engaged in an eye 14 whereby it will be locked in closed position so as to prevent separation of the chains.

The use of the device will be readily understood. After the load, which in the present instance is indicated as logs or lumber, has been piled upon the wagon or other vehicle between the stakes 1, the loops 20 are engaged over the ends of the stakes and pushed down close to the load, the springs 5 engaging against the inner faces of the stakes so as to frictionally bear upon them and thereby hold the loops at any desired point. The locking lever or draw hook 13 is then engaged in a link of the meeting chain and swung back parallel with the chain to which it is attached, after which the eye 14 is engaged over the end of the hook, as shown in Fig. 2, so as to hold the chains tight across the load. The stakes will thus be prevented from spreading and the load will be firmly retained upon the vehicle.

My present device is exceedingly simple in its construction and will hold the stake-engaging yieldable members or springs 5 very securely. The ends of the springs will be entirely within the planes of the sides of the loops and will, therefore, not be so apt to be released by rough handling or accidental blows from the lumber or other material being loaded on the vehicle. Moreover, the tongues or struck-in portions 4 of the stake-engaging loops will permit a limited slipping movement of the eyes or hooks 6 at the ends of the springs so that the springs may be readily engaged against stakes of various dimensions. The rods 7 will effectually restrain spreading of the stake-engaging loops and will not be apt to be accidentally released therefrom while the loops will not mar the stakes inasmuch as they are of flat material and by reason of their flat form will have an extended bearing upon the stakes so that the frictional resistance to dislodgment will be effectual.

Having thus described the invention, what is claimed as new is:

1. A stake holder comprising a stake-engaging loop having portions of its sides struck in, a yieldable stake-engaging member extending between the sides of the loop and having its ends engaged upon said struck-in portions, a connection between the free ends of the loop, and a flexible locking device carried by said connection.

2. A device for the purpose set forth comprising a flat stake-engaging loop having struck-in portions at its sides, a spring extending between the sides of the loop and having its ends in engagement with said struck-in portions, a rod extending between the extremities of the loop and secured therein and provided centrally with a seat, and a locking member engaged in said seat.

In testimony whereof I affix my signature.

CARL O. TORGERSON. [L. S.]